(12) United States Patent
Lu et al.

(10) Patent No.: US 7,650,215 B2
(45) Date of Patent: Jan. 19, 2010

(54) INTEGRATED SENSING SYSTEM

(75) Inventors: Jianbo Lu, Livonia, MI (US); Todd Allen Brown, Dearborn, MI (US); Li Xu, Belleville, MI (US); Joseph Carr Meyers, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 11/771,602

(22) Filed: Jun. 29, 2007

(65) Prior Publication Data

US 2008/0015762 A1 Jan. 17, 2008

Related U.S. Application Data

(62) Division of application No. 10/762,425, filed on Jan. 22, 2004, now Pat. No. 7,239,949.

(60) Provisional application No. 60/449,940, filed on Feb. 26, 2003.

(51) Int. Cl.
*G06F 19/00* (2006.01)
*G06F 17/00* (2006.01)

(52) U.S. Cl. .............................. 701/70; 701/29; 701/37; 280/5.502

(58) Field of Classification Search .................. 701/70, 701/29, 22, 37, 38, 45; 280/5.502, 455.1
See application file for complete search history.

(56) References Cited

U.S. PATENT DOCUMENTS 3,972,543 A * 8/1976 Presley et al. ............. 280/455.1

* cited by examiner

*Primary Examiner*—Tan Q Nguyen
(74) *Attorney, Agent, or Firm*—Angela M. Brunetti; Fredrick Owens

(57) ABSTRACT

A vehicle control system includes a housed sensor cluster generating a plurality of signals. An integrated controller includes a sensor signal compensation unit and a kinematics unit, wherein the sensor signal compensation unit receives at least one of the plurality of signals and compensates for an offset within the signal and generates a compensated signal as a function thereof. The integrated controller further generates a kinematics signal including a sensor frame with respect to an intermediate axis system as a function of the compensated signal and generates a vehicle frame signal as a function of the kinematics signal. A dynamic system controller receives the vehicle frame signal and generates a dynamic control signal in response thereto. A safety device controller receives the dynamic control signal and further generates a safety device signal in response thereto.

7 Claims, 6 Drawing Sheets

Method #2

INTEGRATED SENSING SYSTEM

CROSS-REFERENCE TO RELATED APPLICATIONS

The present application is a divisional of application Ser. No. 10/762,425 which was filed on Jan. 22, 2004 now U.S. Pat. No. 7,239,949, which is related to provisional application No. 60/449,940 entitled "Integrated Sensing System for an Automotive System," filed on Feb. 26, 2003 and incorporated by reference herein.

TECHNICAL FIELD

The present invention relates generally to a vehicle sensing system and, more specifically, to a system for controlling an automotive vehicle in response to sensed dynamic behavior from the sensing system.

BACKGROUND

Various automotive vehicles have recently begun including vehicle dynamic control systems. Such vehicle dynamic control systems include yaw stability control systems, roll stability control systems, integrated vehicle dynamic control systems, etc. The ongoing goal of vehicle controls is to achieve a coordinated system of vehicle performance for ride, handling, safety and fuel economy.

With current advances in mechatronics, vehicle controls have increased opportunities for achieving performances, which were previously reserved for spacecraft and aircraft. For example, gyro sensors, previously only used in aircraft, have now been incorporated in various vehicle controls, and the anti-lock brake systems invented for airplanes are now standard automotive control systems. Current sensor technology generates ever increasing opportunities for vehicle control.

A typical vehicle control system may control up to 3-dimensional vehicle motions. For example, during roll stability control, the control system controls three-dimensional rotational motions along the vehicle roll, pitch, and yaw directions and motion along the vehicle longitudinal, lateral and vertical directions. Yaw control systems typically control yaw motion.

Different motion directions influence the motion in other directions. For example, excessive steering of a vehicle may lead to excessive yaw and lateral motion, which could cause large rolling motion towards the outside of a turn. If the driver brakes the vehicle during the excessive steering, the vehicle will also experience roll and pitch motions in conjunction with lateral and longitudinal accelerations. Therefore, a successful vehicle dynamics control should involve an accurate determination of the vehicle roll, pitch and yaw attitudes (side slip angle).

Currently, inertial measurement units (IMUs) and various other sensors used in aerospace vehicle controls have been incorporated in automotive vehicles for inertial control. IMUs have been used in inertial navigation systems (INS) for aircrafts and satellites for decades. Typically, an INS system determines the attitude of a flight vehicle through IMU sensor signals.

An IMU sensor set includes three gyros and three linear accelerometers. An INS contains an IMU and a processor unit to compute the navigation solutions necessary for navigation, attitude reference and various other data communication sources.

Although INS systems are sufficient to generate a navigation solution, over time the computation based on IMU sensor signals drifts, and the errors associated with the computation increases. Sometimes these errors increase such that a navigation solution is unattainable within the INS. To mitigate this problem and to compute a correct navigation solution over the entire flight, external navigation sources are used to continually correct the attitude computations based on IMU sensor signals. One of the more reliable of external sources is a GPS system with a single or multiple GPS receivers. Such a system has been used to determine a rough attitude reference of a vehicle in flight.

Current automotive vehicle systems experience a similar signal drift problem in vehicle attitude determination. Although the drift is not as severe as in aerospace vehicles, it generates errors within the vehicle control system such that the vehicle control system engages improper actions.

It would therefore be desirable to provide a vehicle system sensing algorithm that uses sensors to determine the vehicle operation states, to monitor abnormal vehicle operation states, and to compensate the sensor errors for various automotive vehicle control applications.

SUMMARY OF THE INVENTION

In one aspect of the invention, a vehicle control system includes a housed sensor cluster generating a plurality of signals. The signals include a roll rate signal, a pitch rate signal, a yaw rate signal, a longitudinal acceleration signal, a lateral acceleration signal, and a vertical acceleration signal, 4 wheel speed sensors and a steering wheel angle sensor.

An integrated controller includes a sensor signal compensation unit and a kinematics unit, wherein the sensor signal compensation unit receives at least one of the plurality of signals and compensates for an offset within the at least one of the plurality of signals and generates a compensated signal as a function thereof. The integrated controller further generates a kinematics signal including a sensor frame with respect to an intermediate axis system as a function of the compensated signal and generates a vehicle frame signal as a function of the kinematics signal.

A dynamic system controller receives the vehicle frame signal and generates a dynamic control signal in response thereto. A safety device controller receives the dynamic control signal and further generates a safety device signal in response thereto.

In a further aspect of the invention, a method for controlling a safety device for a vehicle includes generating a roll attitude angle of a sensor frame with respect to an intermediate axis system; generating a pitch attitude angle of the sensor frame with respect to the intermediate axis system; generating an x velocity component of the sensor frame with respect to the intermediate axis system; generating a y velocity component of the sensor frame with respect to the intermediate axis system; generating a z velocity component of the sensor frame with respect to the intermediate axis system; transferring the roll attitude angle, the pitch attitude angle, the x velocity component, the y velocity component, and the z velocity component in the sensor frame to a body fixed frame system as a function of sensor misalignments.

In still a further aspect of the invention, a method for controlling a safety device for a vehicle includes transforming vehicle dynamic variables from a sensor frame to a body frame as a function of vehicle dynamic sensor misalignments; generating a roll attitude angle of the body frame with respect to an intermediate axis system; generating a pitch attitude angle of the body frame with respect to the intermediate axis system; generating an x velocity component of the body frame with respect to the intermediate axis system; generating a y velocity component of the body frame with respect to the intermediate axis system; and generating a z velocity component of the body frame with respect to the intermediate axis system.

Thus, the present system may be incorporated in but not limited to a rollover stability control system (RSC), a yaw stability control system, an ABS/TCS control system and a power-train control system for fuel economy purpose. One advantage of the invention is that the sensor cluster in tandem with the integrated controller generates accurate vehicle attitude and velocity signals. More specific example is the vehicle longitudinal velocity. During braking or throttle conditions, the wheel speed signal alone would not be able to generate accurate vehicle reference speed (longitudinal velocity) which is used in wheel slip control for achieving RSC/TCS/ABS functions. When the wheels of one side of the vehicle are up in the air (due to large roll trending of the vehicle), those wheel speed information are no longer the valid indications of the vehicle speed. In off-road driving, more than one wheel could behave independently of the vehicle speed.

Another advantage is the substantially improved accuracy of current vehicle dynamics and predicted vehicle dynamics as used in but not limited to rollover stability control systems, yaw stability control systems, ABS/TCS control systems, power-train control systems.

A further advantage is the substantially improved accuracy of the predicted road conditions on which the vehicle is driven. For example, the accurate identification of the road inclination could help the throttle control system to cut unnecessary fuel consumption during down hill driving; the accurate identification of the road surface friction condition could help RSC and yaw stability control.

Still a further advantage is the ability to identify the vehicle parameter changes. For example, the loading or mass variation of the vehicle could be identified so that appropriate level of control actions could be adjusted in proportional to the vehicle loadings.

Another advantage is the ability to detect the sensor misalignment errors and sensor plausibility check. The sensor misalignment errors have two portions (i) the sensor mounting errors; (ii) the uneven loading conditions generating misalignment between the loading vehicle and the unloading vehicle. Such an identification of the sensor misalignment errors could substantially improve the accuracy of the predicted vehicle operation states.

Another advantage is the ability to substantially improve the performance of the four wheel drive vehicle due to the accurate identification of the force and torque applied to the wheels. Therefore, both the command drive torque and the resultant torque on the wheel end can be accurately identified so as to increase the efficiency of the torque-on-demand strategy.

Another advantage is the ability to monitor and detect the potential abnormal states of the vehicle including but not limited to tire under-inflation, tire imbalance, suspension wear, tire wear, brake pad wear and steering misalignment, etc.

Other objects and features of the present invention will become apparent when viewed in light of the detailed description of the preferred embodiment and when taken in conjunction with the attached drawings and appended claims.

DESCRIPTION OF THE PREFERRED EMBODIMENT

Figure 1:
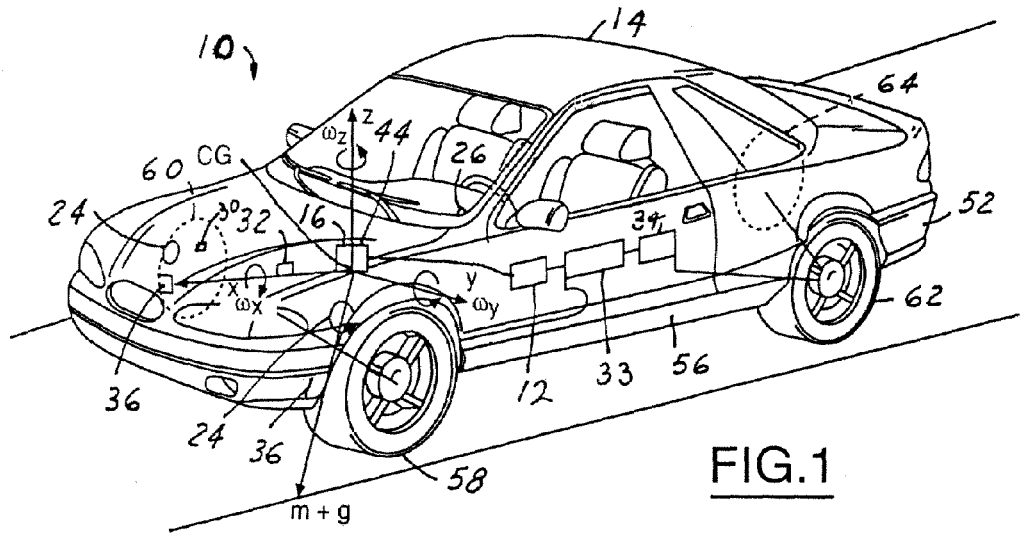
FIG. 1 is a diagrammatic view of a vehicle system in accordance with one embodiment of the present invention.

In the following Figures the same reference numerals will be used to identify the same components. The present invention is preferably used in conjunction with vehicle control systems, which include, but are not limited to a yaw stability control system, a roll stability control system, an integrated vehicle dynamics control system, or a total vehicle control system for achieving fuel economy and safety and other vehicle level performances.

The integrated system controller or integrated sensing system controller (ISS) in the present invention estimates and predicts the vehicle operation states including vehicle global and relative attitudes, vehicle directional velocities, forces and torques applied to a vehicle, etc.; generates a sensor plausibility check; monitors the abnormal conditions of the moving vehicle; and corrects the sensor mounting errors of the sensors. The information generated from the integrated system controller is used to initiate control commands for various control systems including, but not limited to: power-train controls, brake controls, steering controls, transmission controls, suspension controls, etc. Additional controls include warnings to drivers of possible abnormal conditions such as: tire under inflation, tire wear, and unbalanced tires, steering misalignment, on-line conditioning, and calibration of the errors in sensors due to mounting errors. The various functions of the ISS are detailed herein.

Figure 2:
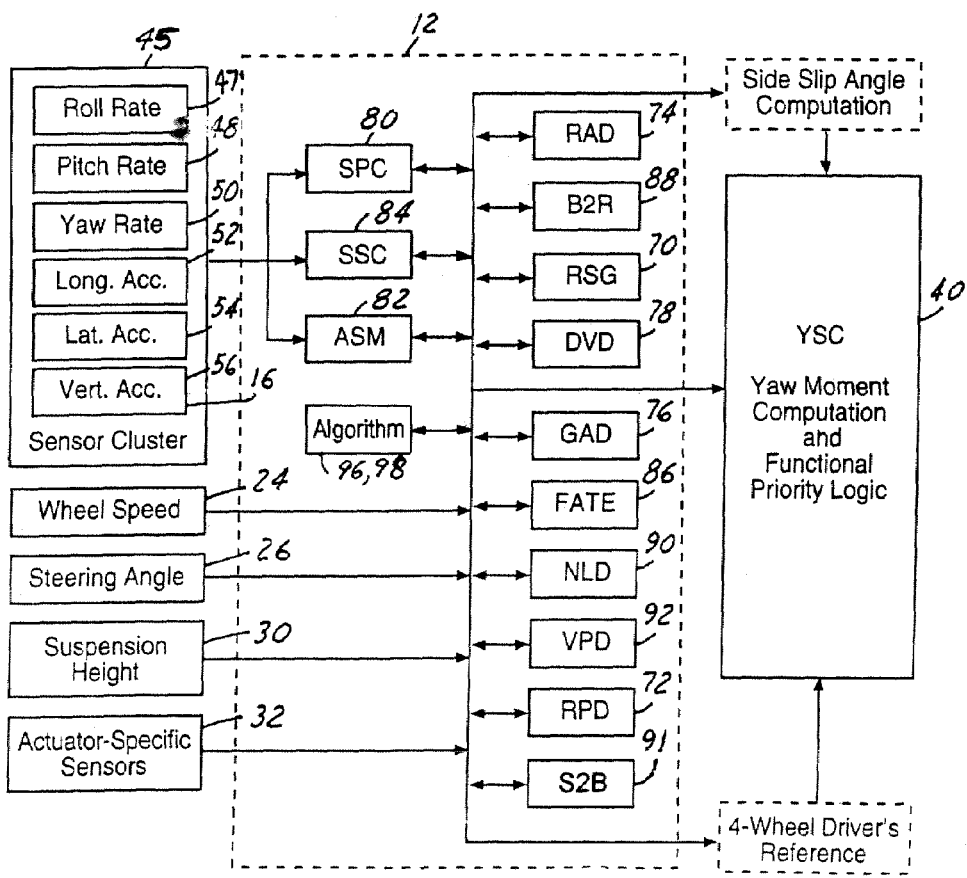
FIG. 2 is a diagrammatic view of a vehicle system in accordance with FIG. 1.
Figure 3:
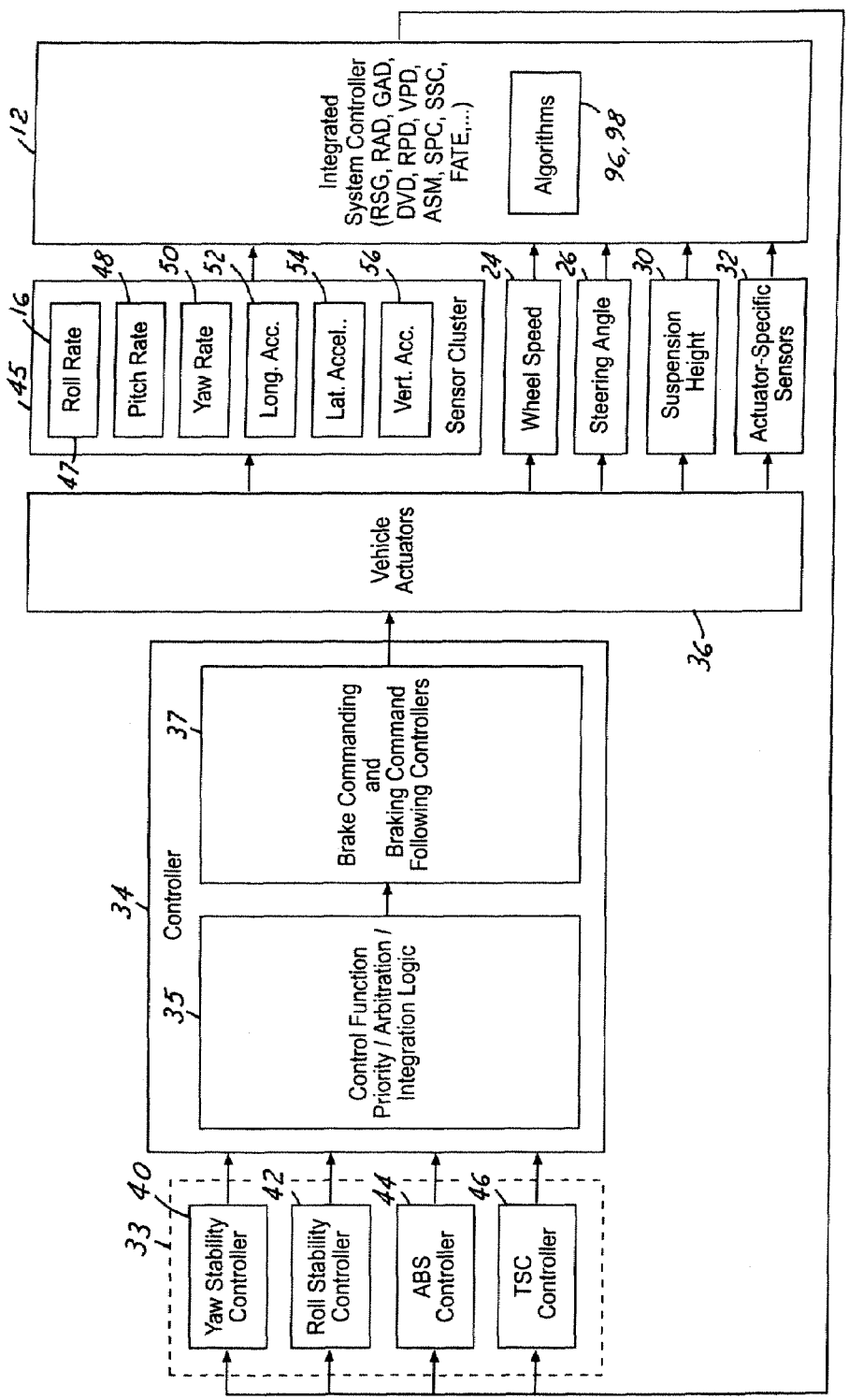
FIG. 3 is a diagrammatic view of a vehicle system in accordance with another embodiment of the present invention.

Referring to FIGS. 1, 2, and 3, a vehicle control system 10 for an automotive vehicle 14 having a controller (here embodied as the integrated sensing system controller 12) is illustrated. The system 10 also includes a sensor cluster 16 or inertial measurement unit (IMU) sensor cluster, wheel speed sensors 24, steering angle sensors 26, suspension height sensors 30, local actuator sensors 32 used by the subsystem controls, a dynamic system controller 33, a braking controller 34 and various alternate vehicle actuators 36, all of which will be discussed in detail later. Notice that the suspension height sensors are not necessary for the ISS to work, some applications might drop them. Some modifications to the algorithms should be conducted in case the suspension height sensors are removed.

The system components are connected in the following possible arrangement: the integrated system controller 12 is electrically coupled to the sensor cluster 16 and various other vehicle sensors 24, 26, 30, 32. Signals from the integrated system controller 12 are received in a dynamic system controller 33, including the yaw stability controller 40, the roll stability controller 42, the antilock braking system (ABS) controller 44, and the traction control system (TCS) controller 46. Signals from the dynamic system controller 33 are received in a braking controller 34. Braking controller signals are received in vehicle and vehicle actuators 36, such as brake calipers and braking devices.

Figure 4:
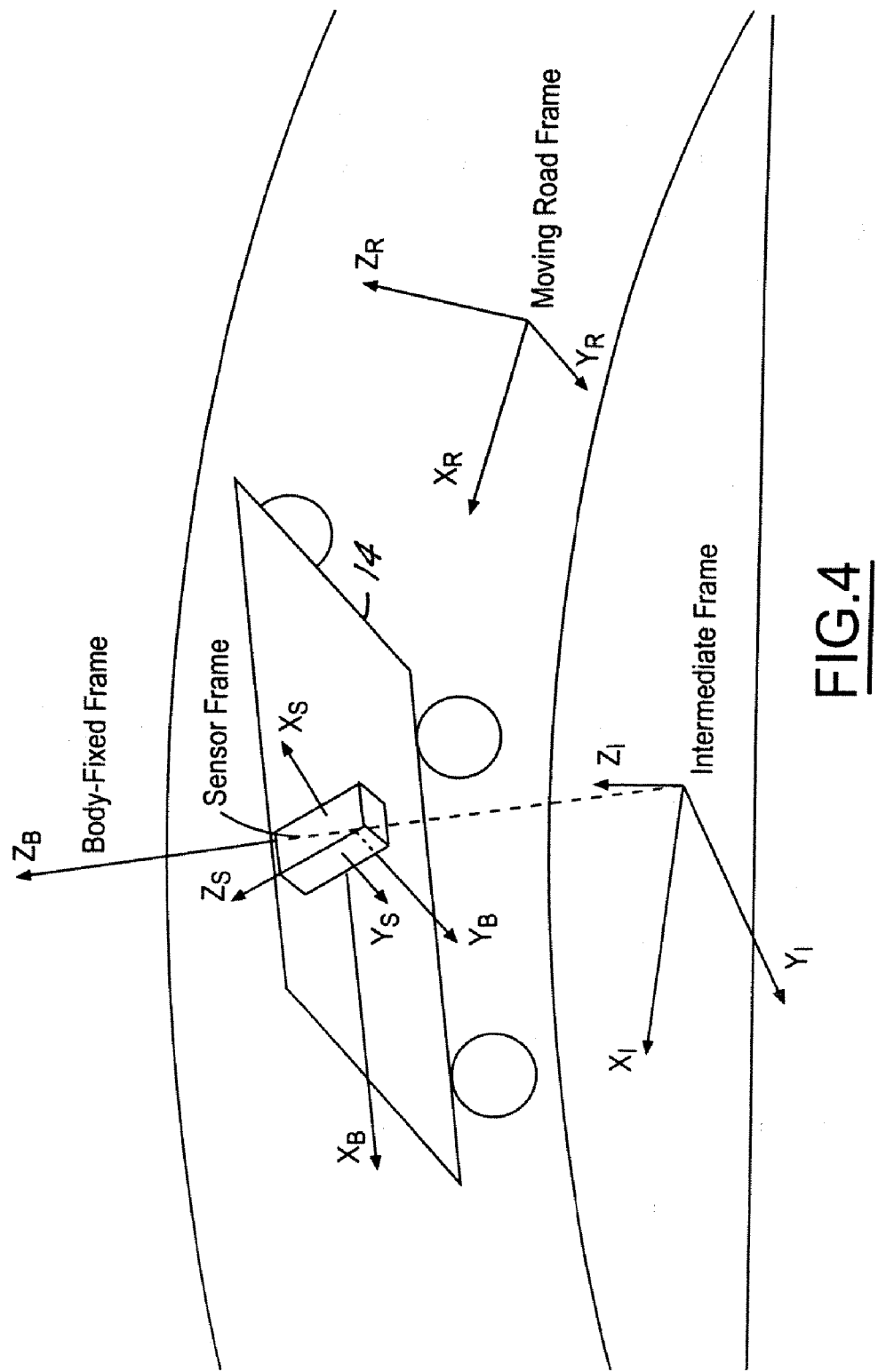
FIG. 4 is an axis system in accordance with another embodiment of the present invention.

Referring to FIG. 4, various frames of reference are indicated for an automotive vehicle 14 to illustrate the system 10. These include an inertial frame ($X_E, Y_E, Z_E$) body-fixed frame ($X_B, Y_B, Z_B$), an ith sensor frame ($X_{Si}, Y_{Si}, Z_{Si}$), an average moving road plane, an Intermediate Axis System ($X_I, Y_I, Z_I$), and an ith wheel frame ($X_{Wi}, W_{Wi}, Z_{Wi}$).

The inertial frame ($X_E, Y_E, Z_E$) is a right-hand orthogonal axis system fixed on the earth. The $X_E$ and $Y_E$ axis are in the horizontal plane and $Z_E$ axis points upwards. The horizontal plane is sea level or the ground level.

The body-fixed frame ($X_B, Y_B, Z_B$) is a right-hand orthogonal axis system fixed on the nominal center of gravity of the vehicle body 14. The $X_B$ axis is in parallel with the average vehicle floor but lying in the longitudinal plane of symmetry. $Y_B$ axis is perpendicular to the longitudinal plane of symmetry of the nominal vehicle body 14 and points towards the driver's left and $Z_B$ axis points upwards.

The intermediate axis system ($X_I, Y_I, Z_I$) is the axis system which yaws with the vehicle and whose roll and pitch attitudes with respect to the inertial frame are zero, and whose origin is the same as the inertial frame.

The ith sensor frame ($X_{Si}, Y_{Si}, Z_{Si}$) is the right-hand orthogonal axis system where the ith group of sensors is assembled, or it is the ith sensor cluster fixed frame. In one embodiment, the axes from the ith sensor frame ($X_{Si}, Y_{Si}, Z_{Si}$) coincide with the axes of the body-fixed frame ($X_B, Y_B, Z_B$). Generally, however, the sensor mounting error causes ($X_{Si}, Y_{Si}, Z_{Si}$) not only to be misaligned with ($X_B, Y_B, Z_B$) in directions but also locations.

The average moving road plane is a plane determined by the four centers of road-tire contact patches. If the road surface is perfectly flat, this plane is the road surface. If the four vertical coordinators of the centers of the contact patches, with respect to the inertia frame, are $z_0, z_1, z_2, z_3$ for front-left, front-right, rear-left and rear-right corners, then the average moving road plane includes the bank angle computed as:

$$\text{average road bank} = \frac{1}{4}\left(\frac{z_0 - z_1}{t_f} + \frac{z_2 - z_3}{t_r}\right) \quad (1)$$

where $t_f$ and $t_r$ are the half tracks of the front and rear axles, and the slope is computed as:

$$\text{average road slope} = \frac{1}{2}\left(\frac{z_2 - z_0}{b} + \frac{z_3 - z_1}{b}\right) \quad (2)$$

where b is the vehicle wheel base. The moving road plane is moving and yawing with the vehicle body. The moving road frame is the right-hand orthogonal axis system ($X_R, Y_R, Z_R$) in which the $X_R Y_R$ plane coincides with the average moving road plane, $X_R$-axis being the projection of the $X_B$ axis on to the average moving road plane, $Y_R$ axis being the projection of the $Y_B$ axis on to the average moving road plane, and $Z_R$ axis points upwards.

The ith wheel frame ($X_{Wi}, Y_{Wi}, Z_{Wi}$) is the right-hand orthogonal axis system in which the $Y_{Wi}$ axis is directed along the wheel spinning direction (but points to the direction of positive wheel angular spinning rate if the vehicle is traveling forward), and the $Z_{Wi}$ axis is perpendicular to the contact patch of the wheel and points upward. Therefore this frame is a local frame and i=0, 1, 2, 3 denotes the front-left, front-right, rear-left and rear-right wheels.

Referring again to FIGS. 1 and 2, the integrated controller 12 includes sensing algorithms including but not limited to RSG 70 (reference attitude and reference directional velocity determinations), RPD 72 (road profile determination), RAD 74 (relative attitude determination), GAD 76 (global attitude determination), DVD 78 (directional velocity determination), SPC 80 (sensor plausibility check), ASM 82 (abnormal state monitoring), SSC 84 (sensor signal compensation), FATE 86 (force and torque estimation), B2R 88 (body-frame to road-frame transformation), NLD 90 (normal loading determination), S2B 91 (sensor-frame to body-frame transformation), VPD 92 (vehicle parameter determination), and additional computational units 96 and 98.

The aforementioned algorithms are included to control for sensor misalignments and relative attitude between the vehicle body and the average road surface. Both sensor misalignment and the relative attitude angles like relative roll and pitch angles are included to conduct corrections. The IMU sensor 16 may have offsets or low frequency bias or drifts, which are compensated before sending the sensor signals to a kinematics unit within the ISS 12, as will be discussed regarding FIGS. 5 and 6.

By closely checking the automotive dynamics, several external correction mechanisms are available including Wheel Speed Alignment (WSA), Road Constraint Alignment (RCA), Level Ground Attitude Alignment (LGAA), and Virtual Heading Angle Alignment (VHAA).

In regards to WSA, the ABS wheel speed sensor signals provide certain vehicle speed content which is similar to one of the GPS-derived velocity but measured along the road surface plane. The longitudinal speed can be aligned with the wheel speed information.

In regards to RCA, the vehicle cannot take off from the road for a long period of time, hence the derivative of the vertical velocity of the vehicle should not have significant low frequency contents. It might have high frequency content due to road unevenness, but it should have zero value in low frequency range.

In regards to LGAA, on level ground, the vehicle attitude can be readily obtained through the chassis attitude angles, namely, the angles calculated from the roll/pitch angular accelerations and longitudinal/lateral accelerations.

In regard to VHAA, in automotive dynamics control, the vehicle absolute heading angle is not required. Hence instead of calculating heading angle, the computations are performed in the reference frame, which is yawing with vehicle while its origin is still fixed on the earth. In other words, the vehicle has heading aligned with the reference frame.

The above four alignment conditions (WSA, RCA, LGAA and VHAA) provide a set replacement conditions which otherwise will be needed from the GPS used in Transfer Alignment. That is, they can be used to achieve removing the low frequency drift in the sensor signals. For this reason, they are a GPS-Replacement.

Figure 5:
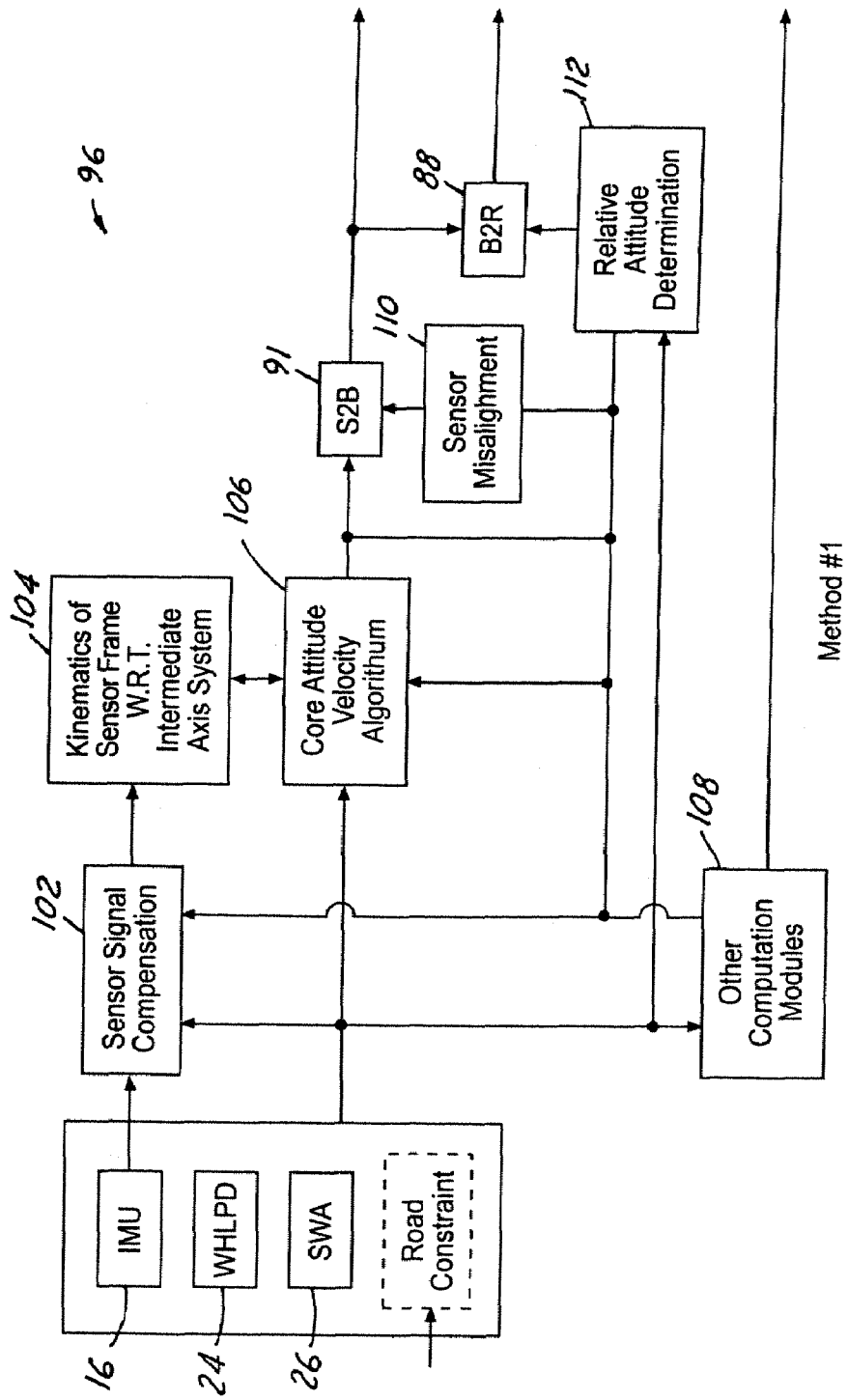
FIG. 5 is an integrated sensing system in accordance with another embodiment of the present invention.
Figure 6:
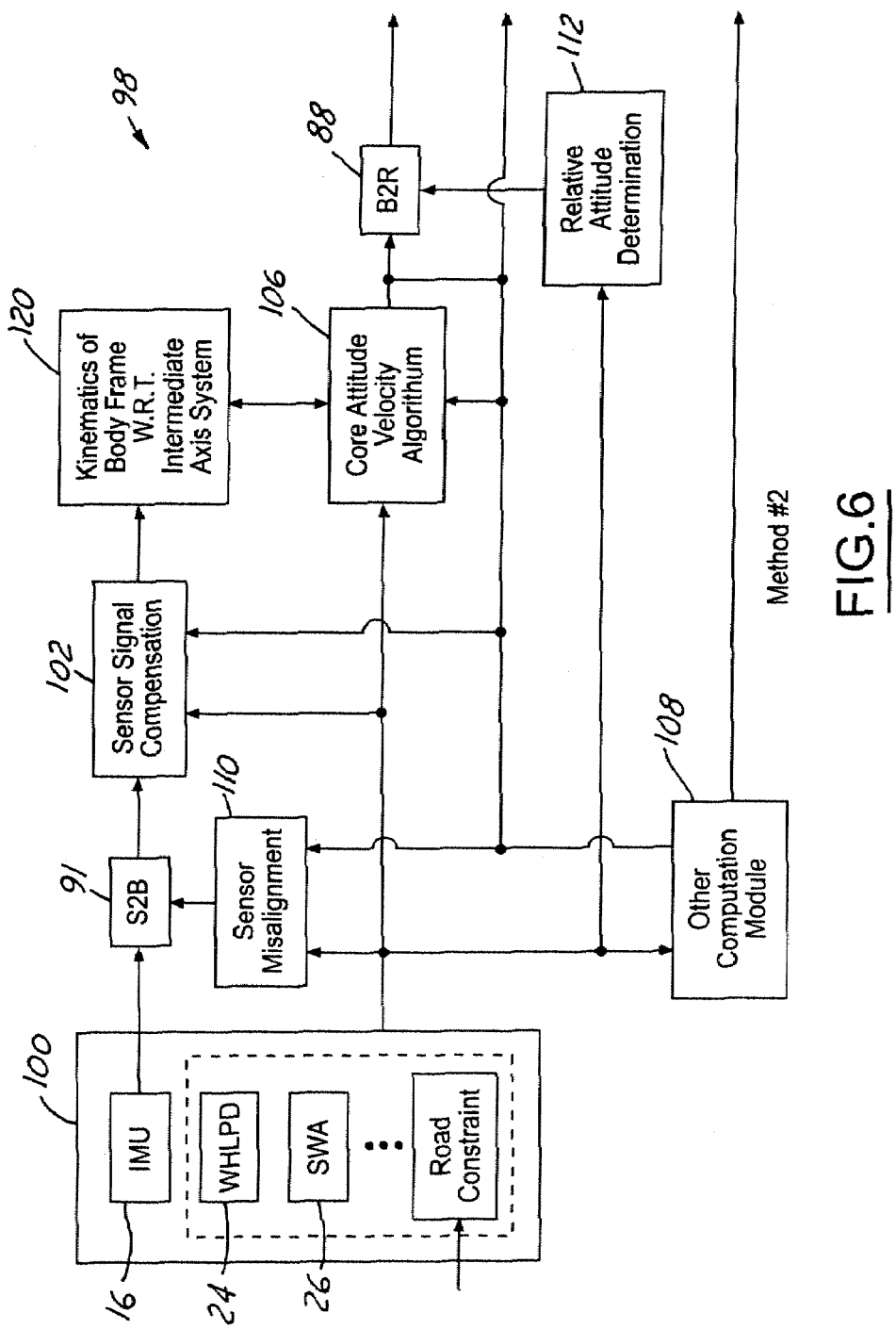
FIG. 6 is an integrated sensing system in accordance with another embodiment of the present invention.

FIGS. 5 and 6 illustrate two examples of how the aforementioned computational units interacted with each other for implementing the present invention in conjunction with the GPS-Replacement.

The first logic, as shown in FIG. 5, includes input sensors 100 (IMU sensor cluster 16, the wheel speed sensors 24, steering wheel sensor 26 and road constraint used as GPS replacement or external correction mechanism), a sensor signal compensation unit 102, a kinematics relationship unit 104, a core attitude and velocity algorithm 106, various other computation modules 108, a sensor alignment unit 110, a transformation unit 88 to transform the signals defined in the car body frame to the signals defined in the fixed reference frame unit, a transformation unit 91 to transform the signals defined in the sensor frame to the signals defined in the body fixed frame, and a relative attitude determination unit 112.

The logic in FIG. 5 receives input sensor signals from the input sensors 100 and compensates for them in the sensor signal compensation unit 102. The compensated sensor signals are received in the kinematics unit 104 controlling kinematics of sensor frame with respect to intermediate axis system, which shares information with the core attitude velocity algorithm 106. The core attitude velocity algorithm 106, which will be discussed later, is used by the S2B 91 to generate a body fixed frame signal. The body fixed frame signal and a relative attitude determination signal from the relative attitude determination unit 112 are received in the B2R 88, which generates therefrom a reference frame signal. The first logic set 96 also generates various other compensation signals from the other computation modules 108, as will be discussed later.

In other words, the logic in FIG. 5 conducts a major computation in the sensor axis system and uses sensor misalignments and an Euler transformation to transfer calculated variables in the sensor frame to the body fixed frame. For the virtual heading angle alignment (VHAA) to be satisfied, the reference frame is the intermediate axis system.

The second logic, as shown in FIG. 6, includes input sensors 100 (IMU sensor cluster 16, the wheel speed sensors 24, steering wheel sensor 26, the road constraint and other correction mechanisms used as GPS replacement or external correction mechanism), a sensor signal compensation unit 102, a kinematics relationship unit 120, a core attitude and velocity algorithm 106, various other computation modules 108, a sensor alignment unit 110, a transformation unit 88 to transform the signals defined in the car body frame to the signals defined in the fixed reference frame unit, a transformation unit 91 to transform the signals defined in the sensor frame to the signals defined in the body fixed frame, and a relative attitude determination unit 112. The second logic set shown in FIG. 6 receives input sensor signals from the input sensors 100 and sensor misalignment signals from the sensor misalignment unit 110 and converts the sensor signals to body fixed frame signals in the S2B 91. The body fixed frame signals are compensated in the sensor signal compensation unit 102 and received in the kinematics unit 120. The kinematics relationship unit 120 of the second logic set 98 determines kinematics of the body frame with respect to an intermediate axis system.

The kinematics signals are shared with the core attitude and velocity algorithm 106, which generates therefrom a core attitude velocity signal. The core attitude velocity signal is received in the B2R, which, along with a relative attitude determination from the relative attitude unit 122, generates therefrom a reference frame signal. The second logic shown FIG. 6. also generates various other compensation signals from the other computation modules 108, as will be discussed later.

In other words, the second logic shown FIG. 6 conducts the major computation in the body fixed frame, therefore the sensor signals are transformed from the sensor axis system to the body-fixed axis system. For the virtual heading angle alignment (VHAA) to be satisfied, the reference frame is the intermediate axis system.

Regarding both logic set examples shown in FIG. 5 and FIG. 6, the roll and pitch attitudes of the vehicle body 14 are related to the roll and pitch angular rate sensor signals through coupled interactions, rather than simple integrations and differentiations. Simple integrations work, however, when the different motions of the vehicle 14 are decoupled. Important to note is that the vehicle yaw motion can be affected by the vehicle pitch and roll motion.

If the vehicle body roll and pitch attitudes with respect to the intermediate axis frame are denoted as $\theta_{xB/I}$ and $\theta_{yB/I}$, then this complicated relationship can be expressed in the following Euler transformation:

$$\dot{\theta}_{xB/I} = \omega_x [\omega_y \sin(\theta_{xB/I}) + \omega_z \sin(\theta_{xB/I})] \tan(\theta_{yB/I})$$

$$\dot{\theta}_{yB/I} = \omega_y \cos(\theta_{xB/I}) + \omega_z \sin(\theta_{xB/I})] \quad (3)$$

The relationship depicted in equation (3) reveals complicated nonlinear functions and it indicates that a simple integration of the roll rate could provide accurate information about the roll attitude only if: (a) both the pitch and yaw rate are negligible, which means the vehicle is dominated by roll motion; (b) the roll attitude angle and yaw rate are negligible, the pitch attitude is limited; and, (c) the pitch attitude angle is negligible with non-extreme pitch and yaw rates.

The simple integration of the pitch rate leads to accurate prediction of the pitch attitude angle if the roll attitude angle is negligible and the yaw rate is not extremely large.

The aforementioned logic sets 96, 98 operate conditionally because the following is simultaneously true:

$$\dot{\theta}_{xB/I} \approx \omega_x, \dot{\theta}_{yB/I} \approx \omega_y$$

if $\theta_{xB/I} \approx 0$ and $\theta_{yB/I} \approx 0$, or $\theta_{xB/I} \approx 0$ and $\omega_y$. That is, either the vehicle has small roll and pitch attitude angles or the vehicle has small roll attitude angle plus small yaw rate, which contradict with the purpose of using them in rollover and pitchover detection, because both roll and pitch attitudes are large, and the vehicle usually experience combined roll, pitch and yaw motions.

A direct integration for the dynamics of equation (3) can be formulated as the following:

$$\theta_{xB/I}(k+1) = \theta_{xB/I}(k) + \{\omega_x(k+1) + [\omega_y(k+1)\sin(\theta_{xB/I}(k)) + \omega_z(k+1)\cos(\theta_{xB/I}(k))]\tan(\theta_{yB/I}(k))\}\Delta T \; \theta_{yB/I}(k+1) = \theta_{yB/I}(k) + \{\omega_y(k+1)\cos(\theta_{xB/I}(k)) - \omega_z(k+1)\sin(\theta_{xB/I}(k))\}\Delta T \quad (4)$$

where $\Delta T$ is the sampling time of ISS 12. As mentioned before, this integration intends to drift due to sensor drift and inevitable numerical errors. As in a Transfer Alignment approach, the low frequency drifts are removed through signals from the GPS unit through the Kalman filter.

Included in the kinematics used in the transfer alignment approach is a set of equations involving the roll, pitch and yaw attitude angles of the sensor frame with respect to the Earth-fixed inertial axis system ($X_E, Y_E, Z_E$).

Those attitude angles are denoted as $\theta_{xS/E}, \theta_{yS/E}$ and $\theta_{zS/E}$. The corresponding velocity components of the origin of sensor frame measured along the sensor axes but with respect to the Earth-fix frame are denoted as $v_{xS/E}, v_{yS/E}$, and $v_{zS/E}$. These equations are as follows:

$$\dot{\theta}_{xS/E} = \omega_{xs} + (\omega_{ys} \sin \theta_{xs/E} + \omega_{xs/E}) \tan \theta_{ys/E}$$

$$\dot{\theta}_{ys/E} = \omega_{ys} \cos \theta_{xs/E} - \omega_{ys} \sin \theta_{xs/E}$$

$$\dot{\theta}_{zs/E} = (\omega_{ys} \sin \theta_{xs/E} + \omega_{zs} \cos \theta_{xs/E}) \sec \theta_{ys/E}$$

$$\dot{v}_{xs/E} = a_{ys} - \omega_{ys} v_{zs/E} + \omega_{zs} v_{ys/E} + g \sin \theta_{ys/E}$$

$\dot{v}_{yS/E} = a_{ys} - \omega_{zs}v_{xS/E} + \omega_{xs}v_{zS/E} - g \sin\theta_{xS/E} \cos\theta_{yS/E}$ $\dot{v}_{zS/E} = a_{zs} - \omega_{xs}v_{yS/E} + \omega_{ys}v_{xS/E} - g \cos\theta_{yS/E} \cos\theta_{yS/E}$ The kinematics 104 used in the first logic set 96 of ISS, shown in FIG. 5, is a set of equations involving the roll, pitch and yaw attitude angles of the sensor frame with respect to the intermediate axis system ($X_I$, $Y_I$, $Z_I$). Because the intermediate axis system ($X_I$, $Y_I$, $Z_I$) yaws with the vehicle, therefore the VHAA is satisfied. That is, the yaw attitude of the sensor frame with respect to the intermediate axis system is close to zero. For that purpose, the yaw degree of freedom in ISS can be dropped.

The corresponding attitude angles may be $\theta_{xS/I}$, $\theta_{yS/I}$, and $\theta_{zS/I}$, and $\theta_{zS/I}$0. The corresponding velocity components of the origin of sensor frame measured along the sensor axes but with respect to the intermediate axis system ($X_I$, $Y_I$, $Z_I$) are denoted as $v_{xS/I}$, $v_{yS/I}$, and $v_{zS/I}$. Such a set of equations includes:

$\dot{\theta}_{xS/I} = \omega_{xs} + (\omega_{ys} \sin\theta_{xS/I} + \omega_{zs} \cos\theta_{xS/I}) \tan\theta_{yS/I}$ $\theta\dot{\theta}_{yS/I} = \omega_{ys} \cos\theta_{xS/I} - \omega_{zs} \sin\theta_{xS/I}$ $\dot{v}_{xS/I} = a_{xs} - \omega_{ys}v_{zS/I} + \omega_{zs}v_{yS/I} + g \sin\theta_{yS/I}$ $\dot{v}_{yS/I} = a_{ys} - \omega_{zs}v_{xS/I} + \omega_{xs}v_{zS/I} - g \sin\theta_{xS/I} \cos\theta_{yS/I}$ $\dot{v}_{zS/I} = a_{zs} - \omega_{xs}v_{yS/I} + \omega_{ys}v_{xS/I} + g \cos\theta_{xS/I} \cos\theta_{yS/I}$ The intermediate system does not travel with the vehicle 14, therefore $v_{xS/I} \neq 0$. Using the other alignment conditions, such as: WSA, RCA and LGAA, the low frequency correction can be achieved.

The kinematics 120 used in the second logic set 98, as illustrated in FIG. 6, includes a set of equations involving the roll, pitch and yaw attitude angles of the body frame with respect to the intermediate axis system ($X_I$, $Y_I$, $Z_I$). Because the intermediate axis system yaws with the vehicle 14, the VHAA is satisfied. That is, the yaw attitude of the body frame with respect to the intermediate axis system is equal to zero. For that purpose, the ISS yaw degree of freedom can be dropped.

The corresponding attitude angles are denoted as $\theta_{xS/I}$, $\theta_{yS/I}$, and $\theta_{zS/I}$, with $\theta_{zS/I}=0$. The corresponding velocity components of the origin of body-fixed frame measured along the body-fixed axes but with respect to the intermediate axis system are denoted as $v_{xB/I}$, $v_{yB/I}$, and $v_{zB/I}$. Equations for this include:

$\dot{\theta}_{xB/I} = \omega_{xB} + (\omega_{YB} \sin\theta_{xB/I} + \omega_{ZB} \cos\theta_{xB/I}) \tan\theta_{YB/I}$ $\dot{\theta}_{YB/I} = \omega_{YB} \cos\theta_{xB/I} - \omega_{YB} \sin\theta_{xB/I}$ $\dot{v}_{xB/I} = a_{xB} - \omega_{YB}v_{ZB/I} + \omega_{ZB}v_{YB/I} + g \sin\theta_{YB/I}$ $\dot{v}_{YB/I} = a_{YB} - \omega_{ZB}v_{xB/I} + \omega_{xB}v_{ZB/I} + g \sin\theta_{xB/I} \cos\theta_{YB/I}$ $\dot{v}_{ZB/I} = a_{ZB} - \omega_{xB}v_{YB/I} + \omega_{YB}v_{xB/I} - g \cos\theta_{xB/I} \cos\theta_{YB/I}$ The intermediate system does not travel with the vehicle 14, therefore $v_{xB/I} \neq 0$. The variables used in the kinematics are:

Road Constraint Alignment:

LPF[vhd zB/R]=0

Wheel Speed Alignment:

$v_{XS/R} = J(\omega_1, \omega_2, \omega_3, \omega_4, \delta, \theta_{XS/R}, \theta_{YS/R})$ Level Ground Attitude Alignment $\theta_{XS/I} = \theta_{X-chassis} + \theta_{XS/B}$ $\theta_{YS/I} = \theta_{Y-chassis} + \theta_{YS/B}$ These are transformed from the sensor frame to the body-fixed frame. That is, the sensor misalignments are required to be detected before the estimation. Using the other alignment conditions such as WSA, RCA and LGAA, the low frequency correction can be achieved. Those alignment conditions are:

Road Constraint Alignment:

LPF[$v_{zB/R}$]=0

Wheel Speed Alignment:

$v_{XB/R} = J(\omega_1, \omega_2, \omega_3, \omega_4, \delta, \theta_{XB/R}, \theta_{YB/R})$ Level Ground Attitude Alignment $\theta_{XB/I} = \theta_{X-chassis}$ $\theta_{YB/I} = \theta_{Y-chassis}$ The IMU 16 requires other sensors providing similar external correction mechanism to a GPS signal. By closely checking the automotive dynamics, several external correction mechanisms are available including wheel speed alignment (WSA) from the wheel speed sensor 24, road constraint alignment (RCA), level ground attitude alignment (LGAA), and virtual heading angle alignment (VHAA).

The outputs of ISS 12 is also used to warn drivers for possible abnormal conditions such as tire under inflation and tire imbalanced, subsystem problems like broken suspensions, severe wear of the brake pads, etc.

The outputs of the ISS will be used to activate passive safety devices. For example, they will be used to deploy side-airbags during a rollover accident. The outputs of the ISS will be used to optimize the fuel economy based on the current driving and road conditions.

The wheel speed sensors 24 are mounted at wheel locations and are denoted as $w_{lf}$, $w_{rf}$, $w_{lr}$, $w_{rr}$ for left-front 58, right-front 60, left-rear 62 and right-rear wheels 64 respectively.

The ABS wheel speed sensor signals include vehicle speed content, which is similar to one of the GPS-derived velocity but measured along the road surface plane. The longitudinal speed can be aligned with the wheel speed information for WSA.

The vehicle 14 does not take off from the road for a long period of time; therefore the derivative of the vertical velocity of the vehicle should not have significantly low frequency contents. It may have high frequency content due to road unevenness, but it should have zero value in low frequency range for RCA.

On level ground the vehicle attitude can be readily obtained through the chassis attitude angles, namely, the angles calculated from the roll/pitch angular accelerations and longitudinal/lateral accelerations for LGAA.

In automotive dynamics control, the vehicle absolute heading angle is not required. Therefore instead of calculating heading angle, the computations are performed in the reference frame, which is yawing with the vehicle 14 while having an origin still fixed on the earth. The vehicle 14 has heading aligned with the reference frame for VHAA.

The above alignment conditions (WSA, RCA, LGAA and VHAA) provide a set replacement conditions, which otherwise are needed from the GPS used in Transfer Alignment. That is, they can be used to remove low frequency drift in the sensor signals and are thus a GPS-Replacement.

The roll/pitch/yaw rates, longitudinal and lateral acceleration signals are used to activate the roll stability control system, the sensors are not intended to be a strap-down IMU sensor cluster 16 because the sensors could be mounted on different locations and vertical acceleration sensor is missing. While in current strap-down IMU sensor setting, the six sensors are arranged orthogonally. That is, the orthogonality among angular rate sensors and the orthogonality among the acceleration sensors are required. With such orthogonality requirements, a set of highly coupled dynamic relationships can be maintained, while in loosely arranged sensor configure ration, such a set of highly coupled dynamic relationships could be wrong. Also such orthogonally arranged sensors help detect the directional and special mounting errors, the sensor failures, sensor signal conditioning and achieve certain sensor fault tolerance.

Referring again to FIGS. 2, 3, 5, and 6, the integrated controller 12 also includes various control units controlling the aforementioned sensing algorithms. These units may include: a reference signal unit 70 (reference signal generator (RSG)), which includes an attitude reference computation and a velocity reference computation, a road profile unit 72 (road profile determination unit (RPD)), an attitude unit or relative attitude determination unit 74 (RAD), a global attitude unit 76 (global attitude determination unit (GAD) and a directional unit 78 (directional velocity determination unit (DVD)), a sensor plausibility unit 80 (sensor plausibility check unit (SPC)), an abnormal state unit 82 (abnormal state monitoring unit (ASM)), a sensor signal compensating unit 84 (SSC), an estimation unit 86 (force and torque estimation unit (FATE)), a normal load unit 90 (normal loading determination unit (NLD)), and a vehicle parameter unit 92 (vehicle parameter determination unit (VPD)). Signals generated from any one of the aforementioned units are referred to prediction of vehicle operation states signals.

The integrated controller 12 receives a vehicle dynamic signal, such as: a roll rate signal, a pitch rate signal, a yaw rate signal, a longitudinal acceleration signal, a lateral acceleration signal, and a vertical acceleration signal from the sensor cluster 16 and other signals from other vehicle sensors, and generates a vehicle reference velocity signal and various other control signals in response thereto, such as an estimate of vehicle operation states signal and a prediction of vehicle operation states signal.

The system 10 includes the sensor cluster 16, wheel speed sensors 24, steering angle sensors 26 (SWA), suspension height sensors 30, and local sensors 32 used by the subsystem controls. Such sensor sets cover almost all existing vehicle control functions. As an illustrative example, the yaw stability control 40 uses only a portion of the sensors from the system sensor set, such as those generating 4-wheel drive reference signals from the reference signal unit 70 and side slip angle computations from the directional unit 78.

The sensor cluster 16, within the housing 45, includes a vehicle dynamic sensor, such as: a roll rate sensor 47 generating a roll rate signal, a pitch rate sensor 48, generating a pitch rate signal, a yaw rate sensor 50 generating a yaw rate signal, a longitudinal acceleration sensor 52 generating a longitudinal acceleration signal, a lateral acceleration sensor 54 generating a lateral acceleration signal, and a vertical acceleration sensor 56 generating a vertical acceleration sensor 56 generating a vertical acceleration signal.

The sensor cluster 16 is mounted on the center of gravity of the vehicle 14 (or mounted on any location of the vehicle 14 that can be transformed into the center of gravity of the vehicle 14), the wheel speed sensors 24 are mounted at each corner of the vehicle 14, and the rest of the sensors are mounted on their respective locations in the vehicle 14.

As was previously mentioned, the sensor cluster 16 includes three gyros 47, 48, 50 and three linear accelerometers 52, 54, 56. The three gyros 47, 48, 50 and three linear accelerometers 52, 54, 56 in the sensor cluster 16 are calibrated and mounted along the vehicle body-fixed directions, x, y and z.

The angular rate outputs of the sensor cluster measure the car body angular rates along the body-fixed axes and are denoted about their respective axes as $\omega_x$ for the roll rate, $\omega_y$ for the pitch rate and $\omega_z$ for the yaw rate. The acceleration outputs from the sensor cluster 16 are measures of the car body directional accelerations along the body-fixed axes and are denoted about their respective axes as $\alpha_x$ for longitudinal acceleration, $\alpha_y$ for lateral acceleration and $\alpha_z$ for vertical acceleration.

The roll, pitch and yaw attitude angles of a vehicle 14 are related to the roll angular rate, pitch angular rate and yaw angular rate sensor signals through coupled interactions, rather than simple integrations and differentiations. Simple integrations work when the different motions of the vehicle 14 are decoupled. In general, complicated relationships exist among the vehicle attitudes and the angular rates.

In the present invention, reference attitudes are obtained through a road constraint. The road constraint considered here is based on the inference that, on average, the vehicle is driven on the road (which could be 3-dimensional), and the vehicle 14 contacts the road and has a small take-off velocity. This road constraint does not exclude the potential vehicle take-off velocity due to road unevenness (for example, bumps) causing vehicle heave vibrations. The average vehicle heave velocity, however, is around zero; and the low frequency portion of the vehicle heave velocity is zero. This unique operating condition for automotive vehicles helps eliminate the need for external sources like GPS to calculate reference attitudes.

Due to the road constraint, a reference attitude can be calculated based on the aforementioned three accelerometer outputs and the three angular rate outputs from the sensor cluster, the vehicle reference velocity calculated from the wheel speed signals, the steering angle, together with the vehicle dynamics model. Such computations are performed in a reference signal generator unit 70, which generates the reference signal therefrom. The vehicle reference velocities include longitudinal reference velocity, lateral reference velocity or a side-slip angle.

Because of the relationships between the sensor signals, the sensor mounting errors can also be corrected within the controller 12. For example, the pitch misalignment of the sensor cluster can be calculated as in the following $$\Delta\theta_y = \sin^{-1}\left(\frac{\dot{v}_x}{\sqrt{A_x^2 + A_y^2}}\right) - \sin^{-1}\left(\frac{A_x}{\sqrt{A_x^2 + A_y^2}}\right)$$

where $$A_x = \alpha_{xs} + \omega_{zs}v_y + g\sin(\theta_{yS/I})$$

$$A_y = \alpha_{zs} - \omega_{xs}v_y + g\cos(\theta_{yS/I})$$

and $v_x$ and $v_x$ is the vehicle longitudinal and lateral velocities calculated on the road frame. For example, $v_x$ can be calculated based solely on the wheel speed signals, $v_y$ can be calculated based on a linear bicycle model of the vehicle. In this case, the above computation will be conducted conditionally: for example, the vehicle is driven straight with deceleration or acceleration.

Similar misalignment or mounting errors of the other sensors are also performed. The sensor information is then used to conduct real-time calibration for sensor signals. For example, the rolling radius calibration for wheel speed sensors can be performed based on the available sensor signals and the calculated signals. Those computations are conducted at the sensor compensation unit or sensor signal unit 84, which generates a sensor compensation signal therefrom.

The sensors also provide information for estimating and predicting the road profile, the road surface and the road curvatures. Such computations are conducted in the road profile unit 72, which generates a road profile signal including but not limited to surface friction level, surface unevenness (roughness), road inclination and bank angle, therefrom.

The abnormal conditions of the vehicle also detected and monitored in the system. These abnormal conditions include tire under-inflation, tire imbalance, actuator failure, wheel lifting, etc. Such functions are performed in an abnormal state unit or abnormal state monitoring unit 82, which generates the abnormal state signal therefrom.

The forces and torques applied to the wheels play important roles in many vehicle control functions. The system 10 also conducts estimation of and prediction of those loadings in an estimation unit or force and torque unit or force and torque estimation unit 86 (FATE), which generates the force and torque signal therefrom.

The reference attitude signal obtained based on all the sensor signals and the road constraint assumption is calculated and then used to correct the attitude computation errors.

Besides the sensor cluster 16, the system 10 also includes wheel speed sensors 24, a wheel steering angle sensor 26, suspension height sensors, and any actuator specific sensors 32 (for example, the brake pressure sensors and all the other sensors which are used for subsystem controls). Therefore the system provides the vehicle operation states, such as: vehicle attitudes with respect to the average road surface, vehicle directional velocity, road profile and surface conditions, traction forces, and tire forces.

Another aspect of the system 10 is the ability to conduct sensor plausibility checks, sensor error compensation, and abnormal vehicle state monitoring and detection because all the sensor signals are available to the system 10. Many of the sensor signals have cross influences over other sensor signals, and there are interconnecting relationship among all the sensor signals.

The dynamic system controller 33 receives the vehicle reference velocity signal and generates a dynamic control signal in response thereto. The dynamic system controller may include a yaw stability controller 40, a roll stability controller 42, an ABS controller 44, or a TCS controller 46, or any combination thereof either separate or together in a single dynamic system unit.

The braking system controller 34 or safety device controller/vehicle safety system receives the dynamic control signal and generates a braking signal in response thereto. The braking system controller 34 includes control function priority/arbitration/integration logic 35 and brake communicating and brake command controllers 37.

The braking system controller 34 receives at least one of a plurality of signals including: the road profile signal, the vehicle attitude signal, the global position signal, the vehicle direction signal, the sensor plausibility signal, the abnormal state signal, the mounting sensor error correction signal, and the force and torque signal. In one embodiment of the present invention, the braking system controller 34 checks the vehicle reference velocity signal with the at least one of the plurality of signals. In alternate embodiments, the braking system controller 34 predicts future vehicle states from at least one of the aforementioned signals and activates safety devices in response thereto.

The various alternate known actuators 36 include active steering systems, active braking systems, active transmission systems, drive-train controls, power-train controls, throttle controls, controllable suspensions, controllable anti-roll-bar, etc. The actuators 36 are activated in response to the signals generated from the integrated system controller 12.

Figure 7:
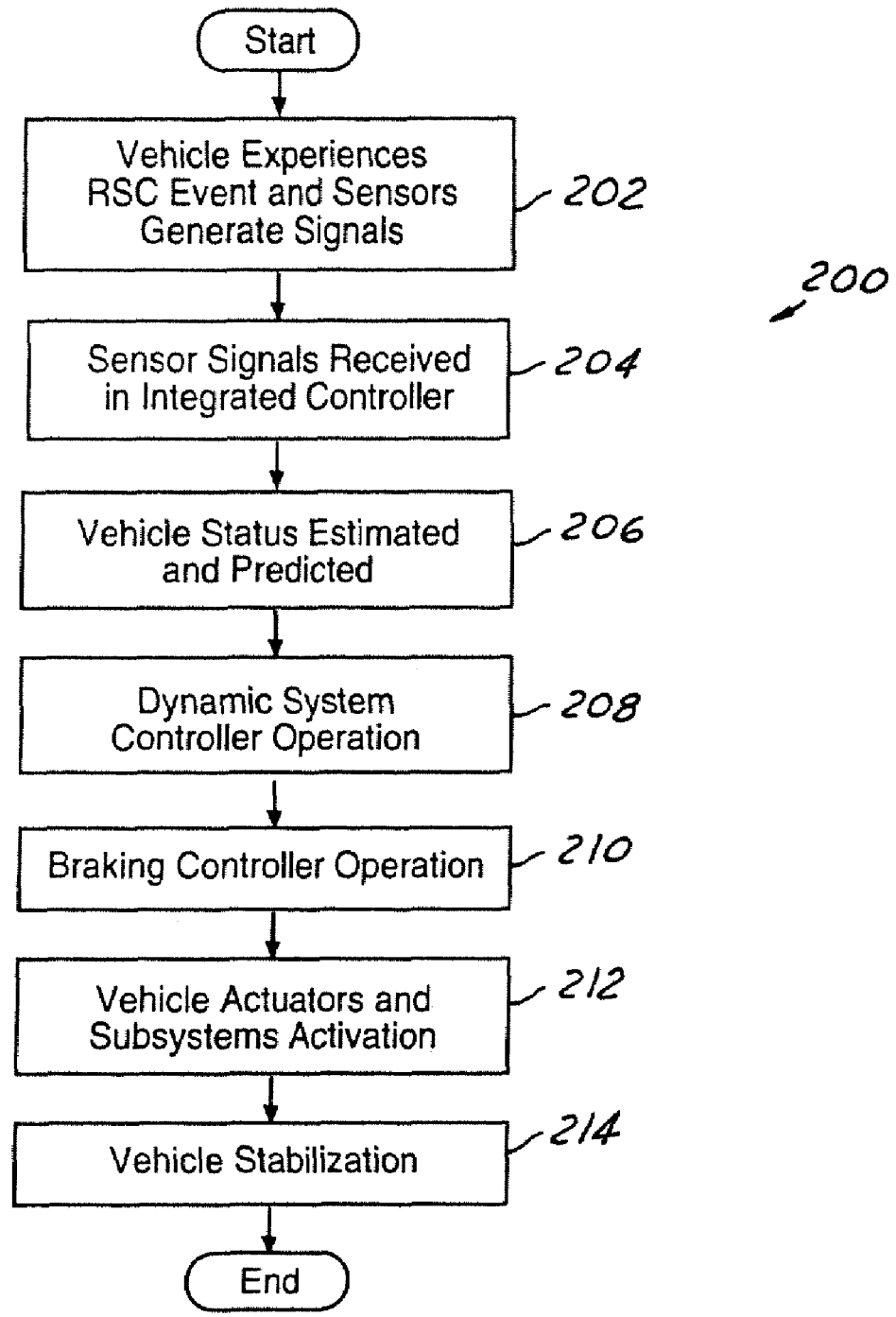
FIG. 7 is a logic flow diagram of a method for controlling a vehicle dynamic system in accordance with another embodiment of the present invention.

Referring to FIG. 7, a logic flow diagram 200 of a method for controlling a vehicle dynamic system, in accordance with another embodiment of the present invention, is illustrated. Logic starts in operation block 202, where the vehicle 14 experiences an RSC event. The sensors within the sensor cluster 16 respond to RSC event data by generating sensor signals, as was previously discussed. In operation block 204, the sensor cluster signals and various other vehicle sensor signals are received in the integrated system controller 12.

In operation block 206, the integrated system controller 12 estimates current vehicle states and predicts future vehicle states in response to the RSC generated sensor signals.

In operation block 208, a dynamic system controller 33 receives the integrated system controller signals and generates therefrom stability control signals.

In operation block 210, the braking controller 34 receives the dynamic system controller signals and generates therefrom braking signals. In response thereto, in operation block 212, vehicle actuators 36 and vehicle systems are activated to respond to or compensate for the RSC event. In operation block 214, the vehicle actuators 36 and systems compensate for the RSC event and attempt to stabilize the vehicle 14.

In operation, one method for controlling a safety device for a vehicle includes generating a roll attitude angle of a sensor frame with respect to an intermediate axis system; generating a pitch attitude angle of the sensor frame with respect to the intermediate axis system; generating an x velocity component of the sensor frame with respect to the intermediate axis system; generating a y velocity component of the sensor frame with respect to the intermediate axis system; generating a z velocity component of the sensor frame with respect to the intermediate axis system; transferring the roll attitude angle, the pitch attitude angle, the x velocity component, the y velocity component, and the z velocity component in the sensor frame to a body fixed frame system as a function of sensor misalignments.

In operation, another method for controlling a safety device for a vehicle includes, transforming vehicle dynamic variables from a sensor frame to a body frame as a function of vehicle dynamic sensor misalignments; generating a roll attitude angle of the body frame with respect to an intermediate axis system; generating a pitch attitude angle of the body frame with respect to the intermediate axis system; generating an x velocity component of the body frame with respect to the intermediate axis system; generating a y velocity component of the body frame with respect to the intermediate axis system; and generating a z velocity component of the body frame with respect to the intermediate axis system.

The methods also include generating an attitude reference computation, generating a road profile signal, generating a vehicle attitude signal, generating a global position signal, generating a vehicle direction signal, generating a sensor plausibility signal, generating an abnormal state signal including information regarding abnormal vehicle conditions, generating a mounting sensor error correction signal, generating a force and torque signal in response to forces and torques applied to the vehicle, generating a body fixed frame to roll frame signal, generating a normal load signal, generating a vehicle parameter signal, and generating the safety device control signal in response to a combination of the attitude reference computation, the road profile signal, the vehicle attitude signal, the global position signal, the vehicle direction signal, the sensor plausibility signal, the abnormal state signal the mounting sensor error correction signal, and the force and torque signal.

While particular embodiments of the invention have been shown and described, numerous variations and alternate embodiments will occur to those skilled in the art. Accordingly, it is intended that the invention be limited only in terms of the appended claims.

What is claimed is:

1. A vehicle control system comprising:
   a housing;
   a plurality of input sensors within said housing generating a plurality of signals including a roll rate signal, a pitch rate signal, a yaw rate signal, a longitudinal acceleration signal, a lateral acceleration signal, and a vertical acceleration signal, a wheel speed signal, a steering wheel angle signal, and conditions among calculated signals reflecting a road constraint, a wheel speed alignment, a level ground attitude alignment, and a virtual heading alignment;
   an integrated controller comprising a relative attitude determination unit and a sensor misalignment unit, said relative attitude determination unit receiving at least one of said plurality of signals and generating a relative attitude signal therefrom, said sensor misalignment unit calculating sensor misalignments within said plurality of signals and generating a sensor misalignment signal as a function of said sensor misalignments, said integrated controller generating a vehicle frame signal as a function of said relative attitude signal and said sensor misalignment signal;
   a dynamic system controller receiving said vehicle frame signal and generating a dynamic control signal in response thereto; and
   a safety device controller receiving said dynamic control signal and further generating a safety device signal in response thereto.

2. The system of claim 1 further comprising a kinematics unit, said kinematics unit receiving said compensated signal and generating a kinematics signal comprising a body frame with respect to an intermediate axis system,
   said integrated controller generating said vehicle frame signal as a function of said kinematics signals.

3. A vehicle system comprising:
   a vehicle dynamic sensor generating a vehicle dynamic signal;
   a wheel speed sensor generating a wheel speed signal;
   a steering angle sensor generating a steering angle signal;
   an integrated controller comprising:
   a sensor signal compensation unit generating a compensated signal as a function of said vehicle dynamic signal, said wheel speed signal, and said steering angle signal,
   a kinematics unit generating a signal comprising a sensor frame signal with respect to an intermediate frame as a function of said compensated signal,
   a core attitude and velocity algorithm unit generating core attitude signals including roll and pitch vehicle body attitudes with respect to said intermediate frame and directional velocity signals including at least one of longitudinal velocity, lateral velocity, vertical velocity of the vehicle with respect to an inertial frame as a function of said wheel speed signal, said steering angle signal, and a relative attitude determination signal, and sharing information with said kinematics unit,
   a relative attitude determination unit generating said relative attitude signal as a function of said wheel speed signal and said steering angle signal,
   a sensor signal to body fixed frame unit generating a body frame signal as a function of said core attitude and velocity signal, said relative attitude signal, and a sensor misalignment signal,
   a sensor misalignment unit generating a sensor misalignment signal as a function of said relative attitude signal,
   a body to reference unit generating a vehicle frame signal as a function of said body frame signal and said relative attitude signal; and
   a vehicle safety system receiving said vehicle frame signal and said body frame signal and activating a vehicle safety device in response thereto.

4. A system as in claim 3, wherein said integrated controller further comprises at least one of a road profile unit generating a road profile signal,
   a relative attitude unit generating a vehicle relative attitude signal,
   a global attitude unit generating a global position signal,
   a directional unit generating a vehicle directional velocity signal,
   a sensor plausibility unit generating a sensor plausibility signal,
   an abnormal state unit generating an abnormal state signal including information regarding abnormal vehicle conditions,
   a sensor signal compensating unit generating a mounting sensor error correction signal,
   a force and torque estimation unit generating force and torque signal in response to forces and torques applied to the vehicle,
   a transformation unit to transform body-fixed signals to road-frame signals,
   a normal loading unit generating a normal load experienced by each vehicle tire, and
   a vehicle parameter unit generating a vehicle parameter signal,
   wherein said vehicle safety system receives at least one of a plurality of signals including said road profile signal, said vehicle attitude signal, said global position signal, said vehicle directional velocity signal, said sensor plausibility signal, said abnormal state signal, said mounting sensor error correction signal, and said force and torque signal,
   and, wherein said vehicle safety system checks said vehicle reference velocity signal with said at least one of said plurality of signals.

5. A vehicle system comprising:
   a vehicle dynamic sensor generating a vehicle dynamic signal;
   a wheel speed sensor generating a wheel speed signal;
   a steering angle sensor generating a steering angle signal;
   an integrated controller comprising:
   a transformation unit transforming signals defined in a sensor frame to signals defined in a vehicle body frame and generating a body frame signal as a function of said vehicle dynamic signal and a sensor misalignment signal,
   a sensor signal compensation unit generating a compensated signal as a function of said body frame signal, said wheel speed signal, and said steering angle signal, a kinematics unit generating a signal comprising a body frame signal and reference signals with respect to an intermediate axis system signal as a function of said compensated signal, a core attitude and velocity algorithm unit generating a core attitude and velocity signal as a function of said wheel speed signal, said steering angle signal, and sharing information with said kinematics unit, a relative attitude determination unit generating a relative attitude signal as a function of said wheel speed signal and said steering angle signal, a sensor misalignment unit generating said sensor misalignment signal as a function of said wheel speed signal and said steering angle signal, a transformation unit transforming signals defined in said vehicle body frame to signals defined in another reference frame and generating a vehicle frame signal and reference signals as a function of said core attitude and velocity signal and said relative attitude signal; and a vehicle safety system receiving said vehicle frame signal and reference signals and said core attitude velocity signal and activating a vehicle safety device in response thereto.

6. A method for controlling a safety device for a vehicle comprising:

generating a roll attitude angle of a sensor frame with respect to an intermediate axis system;

generating a pitch attitude angle of said sensor frame with respect to said intermediate axis system;

generating an x velocity component of said sensor frame with respect to said intermediate axis system;

generating a y velocity component of said sensor frame with respect to said intermediate axis system;

generating a z velocity component of said sensor frame with respect to said intermediate axis system; and transferring said roll attitude angle, said pitch attitude angle, said x velocity component, said y velocity component, and said z velocity component in said sensor frame to a body fixed frame of reference system as a function of sensor misalignments.

7. The method as in claim 6 further comprising generating wheel speed alignment (wsa), road constraint alignment (rca), level ground attitude alignment (lgaa), or virtual heading angle alignment (vhaa) alignment conditions; and removing low frequency drift from within at least one vehicle sensor signal.

* * * * *